(12) United States Patent
Moghadam et al.

(10) Patent No.: US 9,894,354 B2
(45) Date of Patent: Feb. 13, 2018

(54) METHODS AND APPARATUS FOR VIDEO ENCODING AND DECODING USING MOTION MATRIX

(75) Inventors: Abdolreza Moghadam, Okemos, MI (US); Joel Sole, La Jolla, CA (US); Xiaoan Lu, Princeton, NJ (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 860 days.

(21) Appl. No.: 13/879,349

(22) PCT Filed: Oct. 10, 2011

(86) PCT No.: PCT/US2011/055562
§ 371 (c)(1),
(2), (4) Date: Apr. 12, 2013

(87) PCT Pub. No.: WO2012/051094
PCT Pub. Date: Apr. 19, 2012

(65) Prior Publication Data
US 2013/0223523 A1      Aug. 29, 2013

Related U.S. Application Data

(60) Provisional application No. 61/393,186, filed on Oct. 14, 2010.

(51) Int. Cl.
H04N 7/26      (2006.01)
H04N 19/51     (2014.01)
(Continued)

(52) U.S. Cl.
CPC ....... *H04N 19/0069* (2013.01); *H04N 19/132* (2014.11); *H04N 19/172* (2014.11); *H04N 19/517* (2014.11); *H04N 19/97* (2014.11)

(58) Field of Classification Search
None
See application file for complete search history.

(56) References Cited

U.S. PATENT DOCUMENTS 6,157,677 A       12/2000  Martens et al.
7,010,167 B1 *     3/2006  Ordowski ............ G06K 9/6267
                                                    345/644
(Continued)

FOREIGN PATENT DOCUMENTS

CN      1194047 A     9/1998
CN      1802667 A     7/2006
(Continued)

OTHER PUBLICATIONS

Candes, E. J. et al., "Exact Matrix Completion via Convex Optimization", Applied and Computational Mathematics, Caltech, Pasadena, CA 91125; Center for the Mathematics of Information, Caltech, Pasadena CA 91125, May 2008.

(Continued)

*Primary Examiner* — Frederick Bailey
(74) *Attorney, Agent, or Firm* — Brian J. Dorini; Ronald J. Kolczynski

(57) ABSTRACT

Methods and apparatus are provided for video encoding and decoding using a motion matrix. An apparatus includes a video encoder for encoding a picture in a video sequence using a motion matrix. The motion matrix has a rank below a given threshold and a sparse representation with respect to a dictionary. The dictionary includes a set of atoms and basis vectors for representing the picture and for permitting the picture to be derived at a corresponding decoder using only the set. The dictionary formed from a set of reference pictures in the video sequence.

33 Claims, 9 Drawing Sheets

(51) Int. Cl.
*H04N 19/172* (2014.01)
*H04N 19/132* (2014.01)
*H04N 19/517* (2014.01)
*H04N 19/97* (2014.01)

(56) References Cited

U.S. PATENT DOCUMENTS

| | | | |
|---|---|---|---|
| 8,059,715 B2 | 11/2011 | Valente | |
| 8,204,109 B2 | 6/2012 | Xiong et al. | |
| 2003/0043922 A1* | 3/2003 | Kalker | G06T 1/0085 375/240.26 |
| 2005/0207577 A1* | 9/2005 | England | H04N 5/913 380/213 |
| 2008/0055120 A1 | 3/2008 | Monro | |
| 2008/0170623 A1* | 7/2008 | Aharon | G06K 9/6249 375/240.22 |
| 2009/0028239 A1* | 1/2009 | Schuur | H04N 19/176 375/240.03 |
| 2009/0103602 A1* | 4/2009 | Xiong | G06T 9/001 375/240.01 |

FOREIGN PATENT DOCUMENTS

| | | |
|---|---|---|
| JP | 2006-523390 A | 10/2006 |
| JP | 2007-502561 A | 2/2007 |
| WO | 2004/086302 A1 | 10/2004 |

OTHER PUBLICATIONS

Do, T. T. et al, "Compressive Sensing With Adaptive Pixel Domain Reconstruction for Block-Based Video Coding", Technicolor Corporate Research, 2 Independence Way, Princeton, NJ 08540, USA; ICIP Sep. 26-29, 2010.

Donoho, D. L., "Compressed Sensing", Department of Statistics, Stanford University, Sep. 14, 2004.

ITU-T, H.264, Series H: Audiovisual and Multimedia Systems, Infrastructure of audiovisual services—Coding of moving video, Advanced Video Coding for Generic Audiovisual Services, ITU-T Recommendation H.264, Mar. 2005.

Tsaig, Y. et al., "Extensions of Compressed Sensing", Oct. 22, 2004.

Candes, E. et al., "Robust Uncertainty Principles: Exact Signal Reconstruction from Highly Incomplete Frequency Information", Applied and Computational Mathematics, Caltech, Pasadena, CA 91125; Department of Mathematics, University of California, Los Angeles, CA 90095, Jun. 2004; Revised Aug. 2005.

Recht, B. et al., "Guaranteed Minimum-Rank Solutions of Linear Matrix Equations via Nuclear Norm Minimization", Aug. 6, 2008.

Ma, S. et al., "Fixed Point and Bregman Interactive Methods for Matrix Rank Minimization", Oct. 27, 2008; Revised May 7, 2009.

\* cited by examiner

METHODS AND APPARATUS FOR VIDEO ENCODING AND DECODING USING MOTION MATRIX

CROSS-REFERENCE TO RELATED APPLICATIONS

This application claims the benefit, under 35 U.S.C. § 365 of International Application PCT/US2011/055562 and filed Oct. 10, 2011, which was published in accordance with PCT Article 21(2) on Apr. 19, 2012, in English, and which claims the benefit of U.S. Provisional Patent Application No. 61/393,186, filed on Oct. 14, 2010, in English, which are incorporated by reference in their respective entireties.

TECHNICAL FIELD

The present principles relate generally to video encoding and decoding and, more particularly, to methods and apparatus for video encoding and decoding using a motion matrix.

BACKGROUND

A video codec is a device that enables video compression and/or decompression for digital video. There is a complex balance between the video quality, the quantity of the data needed to represent it (also known as the bit rate), the complexity of the encoding and decoding algorithms, robustness to data losses and errors, ease of editing, random access, the state of the art of compression algorithm design, end-to-end delay, and a number of other factors.

Video codecs seek to represent a fundamentally analog data set in a digital format. Since the design of analog video signals, which represent luma and color information separately, a common first step in image compression in codec design is to represent and store the image in a YCbCr color space. The conversion to YCbCr provides the following two benefits: first, the conversion improves compressibility by providing de-correlation of the color signals; and second, the conversion separates the luma signal, which is perceptually much more important, from the chroma signal, which is less perceptually important and which can be represented at a lower resolution to achieve more efficient data compression.

The decoding process is comprised of performing, to the extent possible, an inversion of each stage of the encoding process. The one stage that cannot be exactly inverted is the quantization stage. There, a best-effort approximation of inversion is performed. This part of the process is often called "inverse quantization" or "de-quantization", although quantization is an inherently non-invertible process.

The traditional method of encoding video includes decomposing a frame with respect to a simple movement in a reference and some residue. Turning to FIG. 1, a traditional encoding method is indicated generally by the reference numeral 100. The encoding method 100 involves a frame 2 ($f_2$ at time $t_2$) to be encoded, a (reference) frame 1 ($f_1$ at time $t_1$), and some residue. The frame 2 ($f_2$ at time $t_2$) is encoded using the reference to frame 1 ($f_1$ at time $t_1$) and the residue. Traditional hybrid video codecs such as the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard") are based on this principle. Blocks are intra or inter predicted, and then the typical process of transform, quantization, entropy coding, and potentially, some filtering, is applied.

Video coding is a very broad field and there are decades of research on the topic. A variety of techniques have been applied to it. The recent emergence of compressive sensing has provided yet another tool to use in this problem. For example, in one prior art approach, compressive sensing is used as a mode to encode a data block. However, this approach still relies on the traditional scheme and introduces compressive sensing as a side method within the system.

SUMMARY

These and other drawbacks and disadvantages of the prior art are addressed by the present principles, which are directed to methods and apparatus for video encoding and decoding using a motion matrix.

According to an aspect of the present principles, there is provided an apparatus. The apparatus includes a video encoder for encoding a picture in a video sequence using a motion matrix. The motion matrix has a rank below a given threshold and a sparse representation with respect to a dictionary. The dictionary includes a set of atoms and basis vectors for representing the picture and for permitting the picture to be derived at a corresponding decoder using only the set. The dictionary is formed from a set of reference pictures in the video sequence.

According to another aspect of the present principles, there is provided a method in a video encoder. The method includes encoding a picture in a video sequence using a motion matrix. The motion matrix has a rank below a given threshold and a sparse representation with respect to a dictionary. The dictionary includes a set of atoms and basis vectors for representing the picture and for permitting the picture to be derived at a corresponding decoder using only the set. The dictionary is formed from a set of reference pictures in the video sequence.

According to yet another aspect of the present principles, there is provided an apparatus. The apparatus includes a video decoder for decoding a picture in a video sequence using an approximation of a motion matrix. The approximation of the motion matrix has a rank below a given threshold and a sparse representation with respect to a dictionary. The dictionary includes a set of atoms and basis vectors for representing the picture and for permitting the picture to be derived at the video decoder using only the set. The dictionary is formed from a set of reference pictures in the video sequence.

According to still another aspect of the present principles, there is provided a method in a video decoder. The method includes decoding a picture in a video sequence using an approximation of a motion matrix. The approximation of the motion matrix has a rank below a given threshold and a sparse representation with respect to a dictionary. The dictionary includes a set of atoms and basis vectors for representing the picture and for permitting the picture to be derived at the video decoder using only the set. The dictionary is formed from a set of reference pictures in the video sequence.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
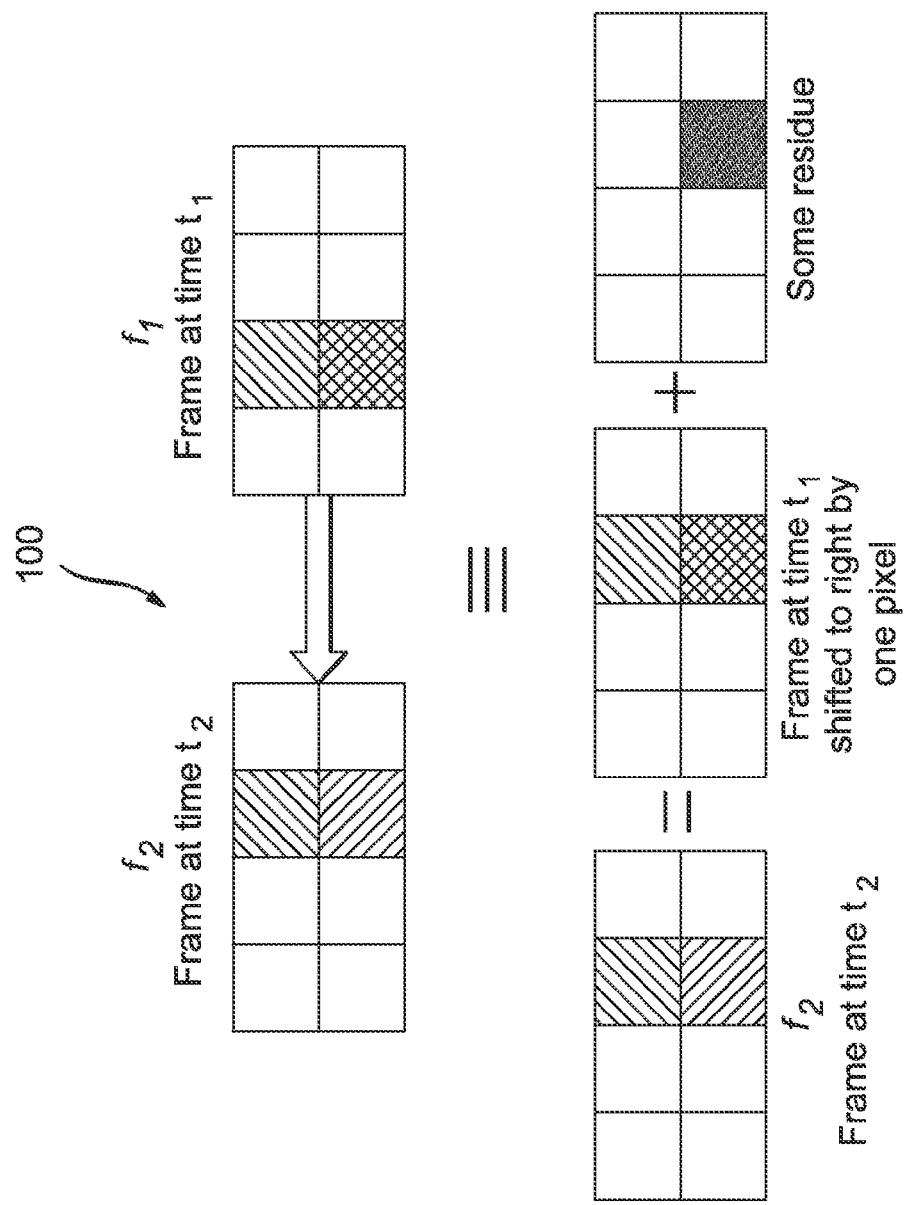
FIG. 1 is a diagram showing a traditional encoding method, in accordance with the prior art.

The present principles are directed to methods and apparatus for video encoding and decoding using a motion matrix.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Figure 2:
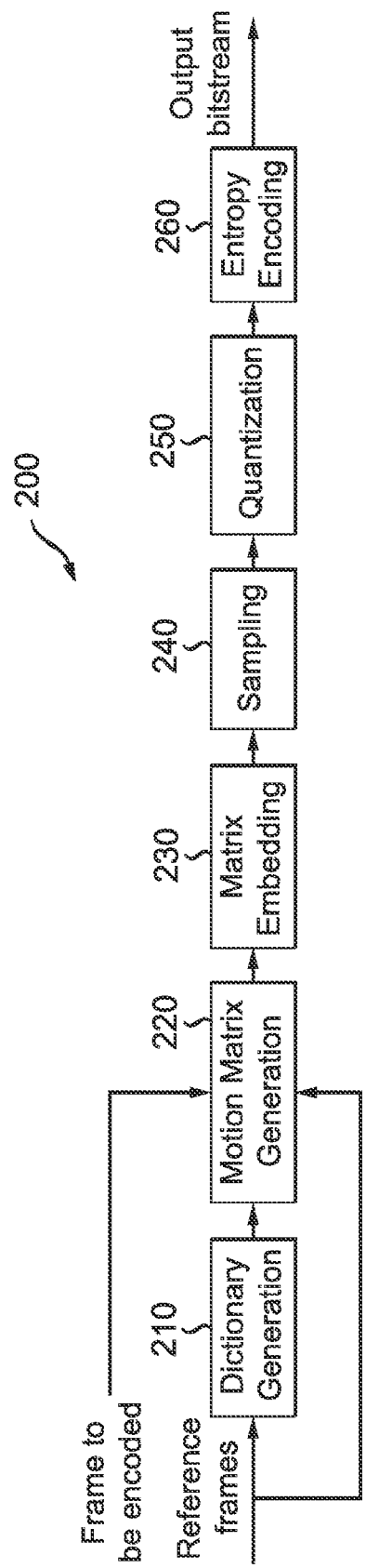
FIG. 2 is a block diagram showing an exemplary video encoder to which the present principles may be applied, in accordance with an embodiment of the present principles.

Turning to FIG. 2, an exemplary video encoder to which the present principles may be applied is indicated generally by the reference numeral 200. It is important to note that FIG. 2 only includes the back-bone of our proposed video encoding approach and can be further improved by blocks such as de-blocking filters, prediction and so on. The video encoder 200 includes a dictionary generator 210 having an output connected in signal communication with a first input of a motion matrix generator 220. An output of the motion matrix generator 220 is connected in signal communication with an input of a matrix embedder 230. An output of the matrix embedder 230 is connected in signal communication with an input of a sampler 240. An output of the sampler 240 is connected in signal communication with an input of a quantizer 250. An output of the quantizer 250 is connected in signal communication with an input of an entropy encoder 260. An input of the dictionary generator 210 and a second input of the motion matrix generator 220 are available as inputs of the encoder 200, for receiving reference frames. A third input of the motion matrix generator 220 is available as an input of the encoder 200, for receiving a frame to be encoded. An output of the entropy encoder 260 is available as an output of the encoder 200, for outputting an encoded bitstream.

Figure 3:
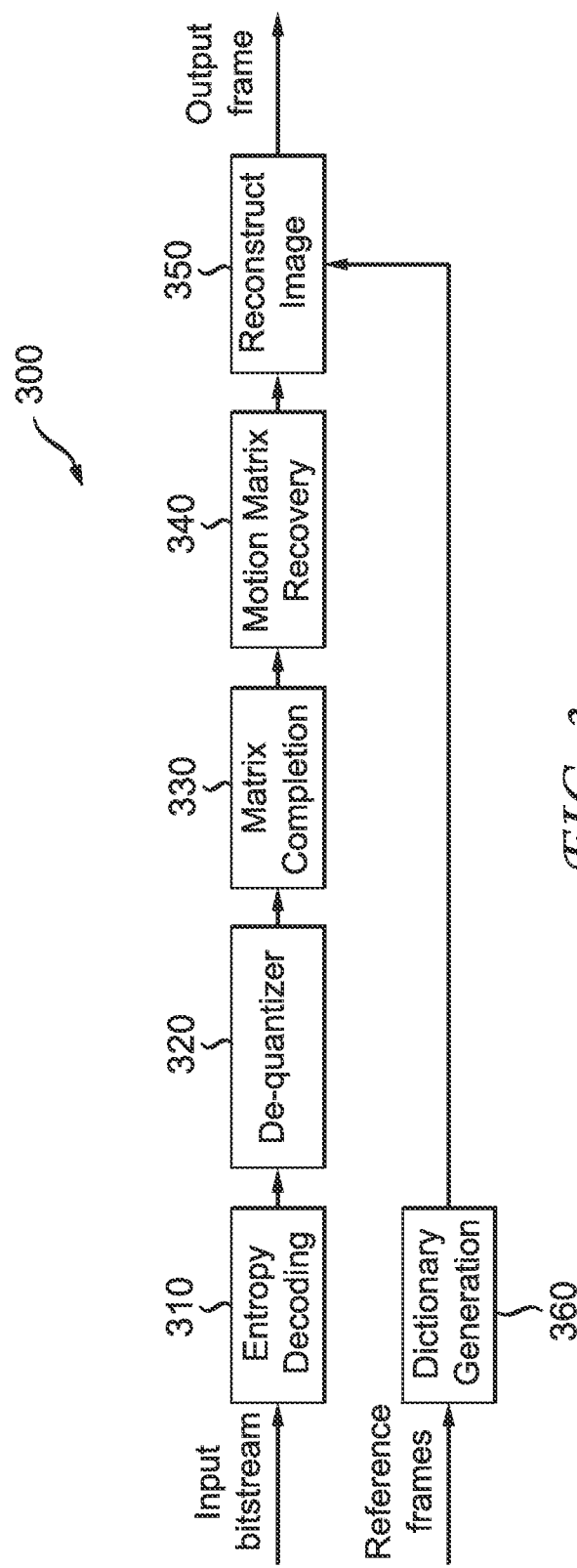
FIG. 3 is a block diagram showing an exemplary video decoder to which the present principles may be applied, in accordance with an embodiment of the present principles.

Turning to FIG. 3, an exemplary video decoder to which the present principles may be applied is indicated generally by the reference numeral 300. It is important to note that FIG. 3 only includes the back-bone of our proposed video decoding approach and can be further improved by blocks such as de-blocking filters, prediction and so on. The video decoder 300 includes an entropy decoder 310 having an output connected in signal communication with an input of a de-quantizer 320. An output of the de-quantizer 320 is connected in signal communication with the input of a matrix completer 330. An output of the matrix completer 330 is connected in signal communication with an input of a motion matrix recoverer 340. An output of the motion matrix recoverer 340 is connected in signal communication with a first input of an image reconstructor 350. An output of a dictionary generator 360 is connected in signal communication with a second input of the image reconstructor 350. An input of the entropy decoder 310 is available as an input of the decoder 300, for receiving an input bitstream. An input of the dictionary generator 360 is available as an input of the decoder 300, for receiving reference frames. An output of the image reconstructor 350 is available as an output of the decoder 300, for outputting one or more reconstructed images. The image reconstructor 350 may include one or more additional inputs, for receiving reference frames.

As noted above, the present principles are directed to methods and apparatus for video encoding and decoding using a motion matrix.

To achieve high compression efficiency, virtually all video encoding schemes exploit the following:

(a) The temporal correlation or the correlation among consecutive frames, and
(b) The spatial correlation or equivalently the correlation among adjacent pixels (or otherwise nearby pixels) within a frame and/or picture.

The high spatial correlation means that if we consider an N×M pixel digital image in the matrix form (where the pixel value at location (i, j) is stored in the (i, j)$^{th}$ entry of that matrix), then the pixel values for that image have a strong correlation and are not independent. From a mathematical point of view, this means that the corresponding matrix has a low-rank or low independence. Meanwhile, high temporal correlation means that a major portion of a frame at a specific time can be found either exactly or approximately in the previous frames (perhaps in different locations). In accordance with the present principles, we have developed a new system which utilizes the mathematical tools of compressive sensing and low-rank matrix completion. We refer to this new approach as the concept a "motion matrix", which represents an alternative approach for utilizing high temporal and spatial correlations to encode a video sequence.

We disclose and describe the principles of the motion matrix and how the motion matrix is implemented in a video encoder and decoder. Furthermore, examples/embodiments of the proposed motion matrix are presented and different components of the corresponding encoder/decoder are described. The scheme includes several new coding blocks described herein.

Also, for simplicity of demonstration and without loss of generality, the present principles are described in the context of P-frames where there is only one reference frame. Clearly, the ideas can easily be extended to the case with multiple reference frames.

Overview

In accordance with the present principles, we describe a system to encode and decode video content. Although described in certain contexts and embodiments for purposes of clarity of description, other embodiments would be apparent to those skilled in the art which utilize one or more of the same principles described herein and therefore are not to be excluded from falling under the rubric of the present principles. For example, the compressive sensing module at the decoder can be accomplished using a "basis pursuit" algorithm, but there exist other common algorithms in the literature (as well as other future developed algorithms) that can attain the same purpose, and they are meant to be included under the general principles and scope of the invention. We note that a basis pursuit (BP) algorithm involves solving a convex optimization problem. More specifically, BP finds the solution with the minimum L1 norm (the sum of absolute values) to an under-determined system of linear equations y=Px, where the values of y and the matrix of coefficients P are given and x is the unknown vector. Furthermore, by an under-determined system of linear equations, we mean that the number of equations (here the number of rows of the matrix of P) is less than the number of unknowns (the length of the unknown vector x). In a mathematical form, BP solves the following optimization problem:

$$\text{Argmin} \|x\|_1 = \Sigma |x_i| \text{ such that } y=Px$$

It has been proved that under certain conditions the solution found by BP would be the sparsest solution, i.e. the solution with the minimum number of non-zeros.

Consider $f_1$, an image at time $t_1$ from a video sequence. Suppose this image changes into $f_2$ at time $t_2$, for instance as illustrated in FIG. 1. Broadly speaking, in most traditional video encoding schemes, such movement would be decomposed as follows:

$$f_2 = X(f_1) + R$$

where X(.) is a basic function and R is some residue. For instance, regarding the example of FIG. 1, X(.) is a function which takes an image ($f_1$) as input and then shifts the image ($f_1$) to the right by one pixel for the output and R is the residue. The compression would be gained by encoding X(.) and R in an efficient way. Back to the example, X(.) might be encoded as the motion vector and R can be efficiently compressed by representing R in a transform domain such as discrete cosine transform (DCT). Note that this generic framework of encoding, i.e., decomposing an image with respect to some movements in the reference frame and some residue utilizes the temporal correlations extensively to achieve the compression. The spatial correlation is also utilized by transform coding of the residue. On the other hand, the available transforms such as DCT, wavelets and so on, are designed to sparsify (to make sparse) a highly correlated image, instead of the residue. In other words, although utilizing transforms to encode the residue has been successful in the past, spatial correlation may be used in future developed schemes to even further enhance the ability to compress the video data.

The method and apparatus we describe herein, in accordance with the principles of the present invention, and using developments recently developed for the problem of the under-determined system of linear equations and also low-rank matrix completion, are used to design alternative encoding and decoding schemes.

Motion Matrix

A motion matrix for a frame to be encoded (for instance $f_2$ in FIG. 1) is a matrix Y. The decoder can uniquely reconstruct the encoded frame using the motion matrix and reference frames (e.g. $f_1$). Furthermore, the motion matrix has the following two additional key properties:

The motion matrix has a low rank. In other words, the entries of Y are highly correlated.

The motion matrix has a sparse representation $\alpha$ with respect to $\psi$, a dictionary, i.e., a set of atoms/basis vectors (for example, Discrete Cosine Transform is a dictionary for representing an image) which can be derived in the decoder without requiring the knowledge of the frame to be encoded; that is Vec(Y)=$\psi\alpha$, where Vec(.) denotes the vectorized form of a matrix (see FIG. 4), formed by stacking the columns of a matrix and $\alpha$ is a sparse vector whose elements are mostly zeros.

Here, we have to note that the motion matrix introduced in this document departs from those in displacement matrix and motion matrices of the prior works both in concepts and also the approach chosen to achieve compression. In the following, we highlight some of key differences:

The displacement and prior motion matrices mainly utilize binary matrices. On the other hand, the entries of the proposed motion matrix can take any number including negative and floating point numbers.

The entries of displacement and motion matrices in prior works, indicate the existence of some kinds of motion in some blocks and/or pixels. On the other hand, the entries of the proposed motion matrix are not restricted to the task of indicating movements in some blocks. For instance, the entries of the proposed motion matrix might inform some global movements in the whole frame (a function of all movements in a frame).

In prior works, given the reference frames, the motion and/or displacement matrix is usually not sufficient for reconstructing a frame. For instance, there might be a need to transmit overhead data such as a residue matrix or other signaling for a desirable reconstruction in the decoder side. Our method is directed to a standalone motion matrix, where given the reference frames, it only suffices to have the motion matrix to approximate an already coded frame with a desirable error.

Traditional motion and/or displacement matrices do not fall under our proposed motion matrix framework since they (usually) violate all the necessary conditions in our definition. For instance, consider a frame or a block where a diagonal line shifts to the right or the left by some pixels. Then, it is straightforward to see that the corresponding displacement matrix would be a diagonal matrix which is full rank (the maximum possible rank). Moreover, such diagonal matrix (or equivalently image) is not sparse under traditional transforms such as DCT, Wavelet and so on (although there might be some directional transforms suitable for these kinds of matrices, however then we need to transmit the parameters of those transforms/dictionaries to the decoder which translates into extra overhead). Hence, traditional displacement/motion matrices can easily violate two necessary conditions for a motion matrix (i.e., being of low rank and the existence of a sparsifying domain).

Another difference appears in the decoding stage. More specifically, traditional encoding methods utilize prediction and residue coding to achieve compression. On the other hand, we utilize recently developed/solved algorithms/problems such as matrix completion and solving under-determined system of linear equations (using Compressed Sensing) to achieve a similar goal.

Lastly, but not least, traditional displacement and motion matrices typically are a function of temporal correlation among different frames and are less sensitive (if any) to spatial correlations among adjacent pixels within a frame. However, our proposed motion matrix considers temporal and spatial correlations jointly at the same time to compress video contents.

Figure 4:
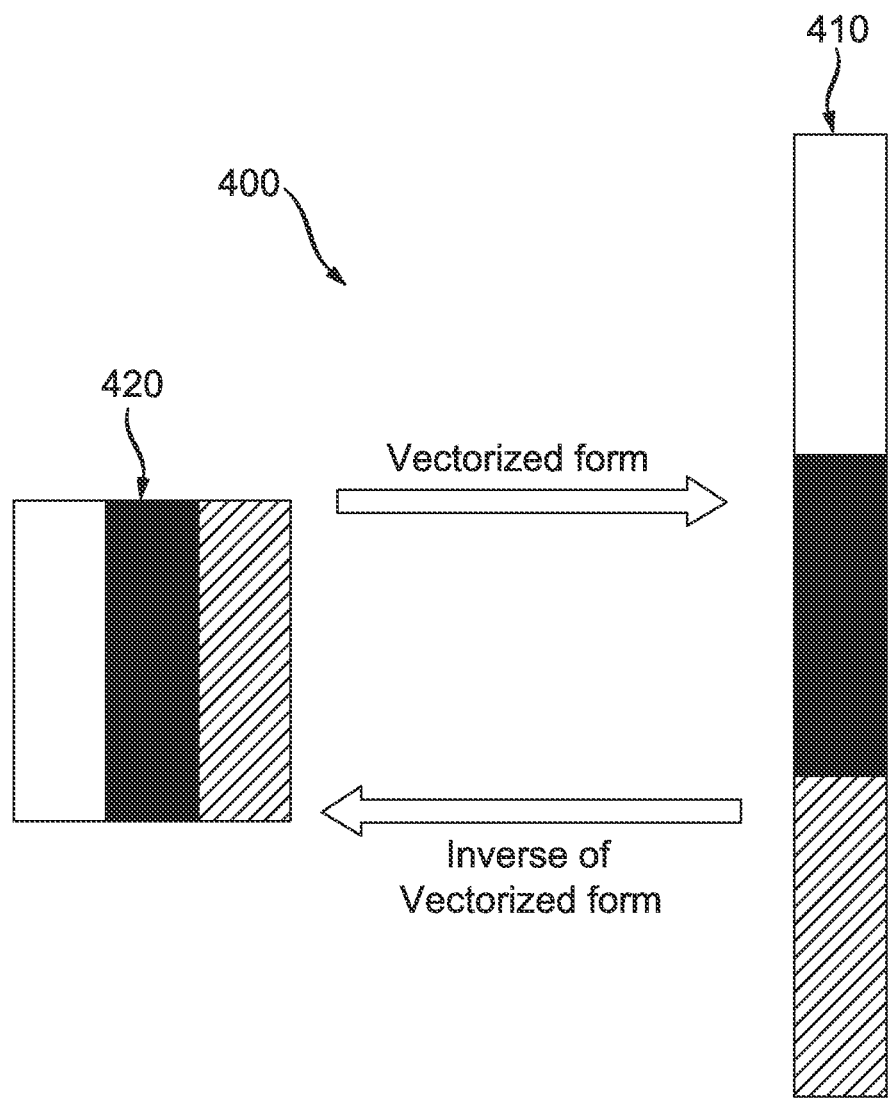
FIG. 4 is a diagram showing exemplary operations of vectorizing a motion matrix and an inverse of the vectorizing operation, in accordance with an embodiment of the present principles.

Turning to FIG. 4, exemplary operations of vectorizing a motion matrix and an inverse of the vectorizing operation is indicated generally by the reference numeral 400. The vectorized form is indicated by the reference numeral 410 and the inverse of the vectorized form is indicated by the reference numeral 420.

The motion matrix can be formed by jointly exploiting the high spatial correlation (resulting into a low-rank matrix) and high temporal correlation (leading to the existence of a sparsifying frame) of the frame to be encoded. It is to be appreciated that formation of the motion matrix is not limited to the preceding approach and, thus, other approaches for forming the motion matrix can also be used in accordance with the teachings of the present principles provided herein, while maintaining the spirit of the present principles.

It follows a presentation of the corresponding encoder and decoder for a motion matrix based video encoding scheme.

Figure 5:
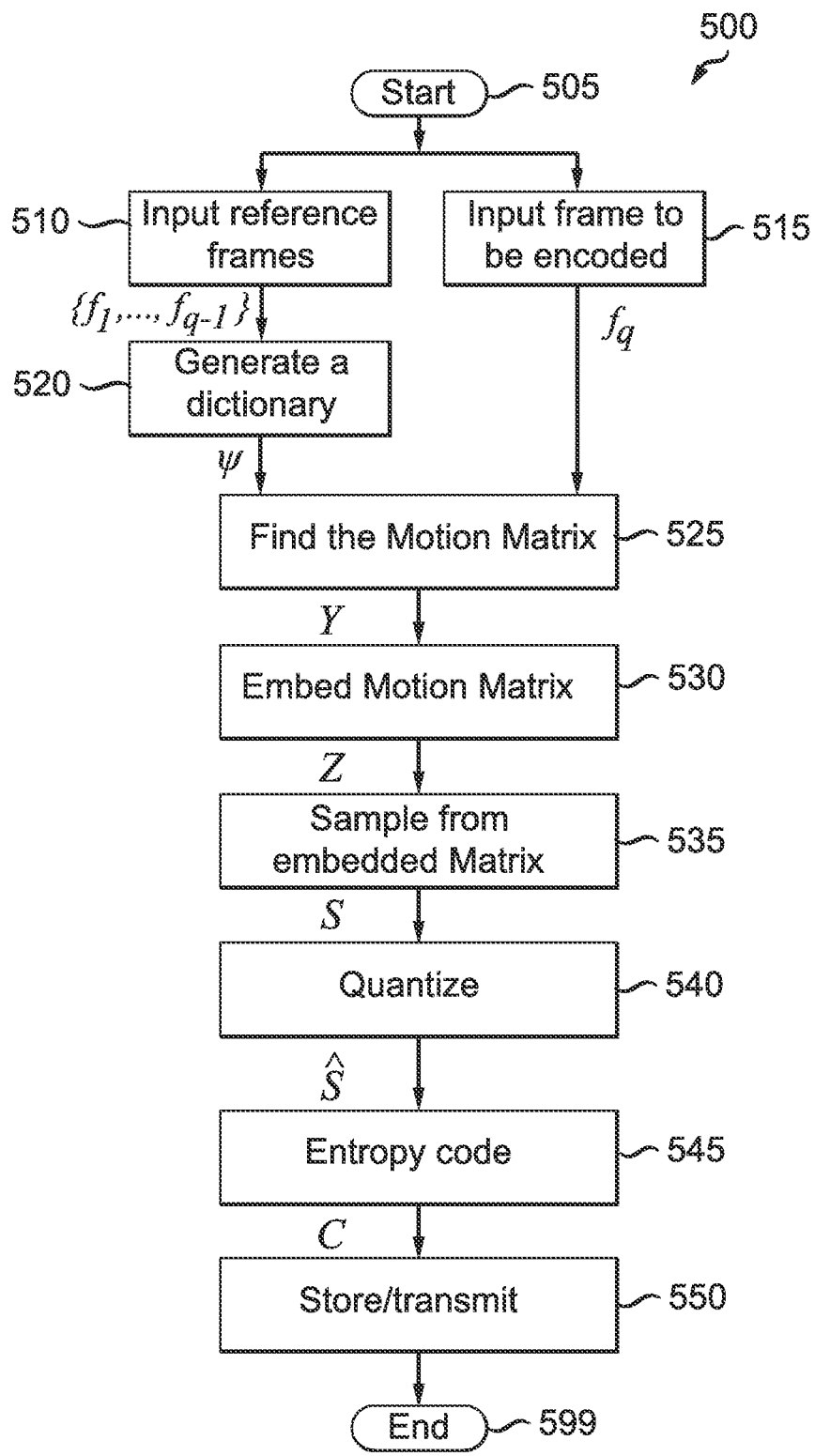
FIG. 5 is a flow diagram showing an exemplary method for encoding using a motion matrix based video coding scheme, in accordance with an embodiment of the present principles.

Turning to FIG. 5, an exemplary method for encoding using a motion matrix based video coding scheme is indicated generally by the reference numeral 500. The method 500 includes a start block 505 that passes control to a function block 510 and a function block 515. The function block 510 inputs reference $\{f_1, \ldots, f_{q-1}\}$ frames, and passes control to a function block 520. The function block 520 generates a dictionary (e.g., based on the reference frames) where the frame to be encoded is sparse with respect to that dictionary, and passes control to a function block 525. The function block 515 inputs a frame to be encoded, $f_q$, and passes control to the function block 525. The function block 525 finds the motion matrix, and passes control to a function block 530. The function block 530 embeds the motion matrix into a (possibly smaller) matrix which is easier to compress, and passes control to a function block 535. The function block 535 samples from the embedded matrix (i.e., keeps a subset of entries and discards the rest), and passes control to a function block 540. The function block 540 quantizes samples of the embedded matrix, and passes control to a function block 545. The function block 545 entropy codes the quantized samples of the embedded matrix, and passes control to a function block 550. The function block 550 stores and/or transmits the entropy coded samples of the embedded matrix, and passes control to an end block 599.

The encoding method 500 for the described motion matrix includes five major components:

1. Given a frame to be encoded and a series of reference frames, form a dictionary $\psi$ (where the frame to be encoded would be sparse with respect to the dictionary) and find the motion matrix Y. As noted before, having the motion matrix Y and the reference frames (and, hence, the sparsifying dictionary $\psi$), the decoder would be able to reconstruct the encoded frame.

2. Embedding the motion matrix into an embedded matrix $Z=p_1 Y p_2$, where $p_1$ and $p_2$ are two matrices. Note that, by design the embedded matrix Z inherits all desirable properties of the motion matrix, namely the low-rank property and the existence of a sparsifying basis for it which can be utilized to achieve further compression. The deployed matrices $p_1$ and $p_2$ might also help us in the compression. For instance, if $p_1$ and $p_2$ are a wide and a tall matrix respectively, then the embedded matrix Z would be smaller than the motion matrix which translates into another level of compression. The purpose of this step is to make sure that many entries of Z might be discarded safely and meanwhile the decoder is able to recover the discarded entries. Furthermore, this step is crucial for the success of steps 3 and 4 of the decoder as shown herein after. It is important to note that matrices $p_1$ and $p_2$ are chosen such that (a) having Z, $p_1$ and $p_2$, we are able to reconstruct back the motion matrix Y and (b) the Eigen-vectors of Z are sufficiently random. For instance, if $p_1$ and $p_2$ are a wide random matrix and a tall random matrix respectively, then both of the aforementioned requirements would be satisfied even though the embedded matrix Z is smaller than the motion matrix Y. Although such random selection of matrices $p_1$ and $p_2$ might not be the optimal approach in terms of compression.

3. Sampling: Keep S, a (possibly random) subset of entries of the embedded matrix Z and discard the rest of entries. One might think that this step is reminiscent of the compression step in the traditional video schemes where we keep the top largest DCT coefficients of a residue (or image itself) and signal the values and the locations of such large magnitude entries. On the other hand, this step in our scheme is completely random and does not discriminate any entry of the embedded matrix to other entries. Consequently, if the encoder and the decoder use the same random seed and random number generator, they would both agree on the locations of the entries of Z. Thus, there would be no need to signal the locations of these entries and the encoder can only store/transmit the sample values.

4. Quantize S, the samples from the embedded matrix, into $\hat{S}$. Clearly, this is a lossy compression step. However, this step is essential for virtually all compression techniques.

5. Entropy encode the quantized samples $\hat{S}$ of the embedded matrix into compressed symbols C. These symbols C would be stored or transmitted to the decoder.

Figure 6:
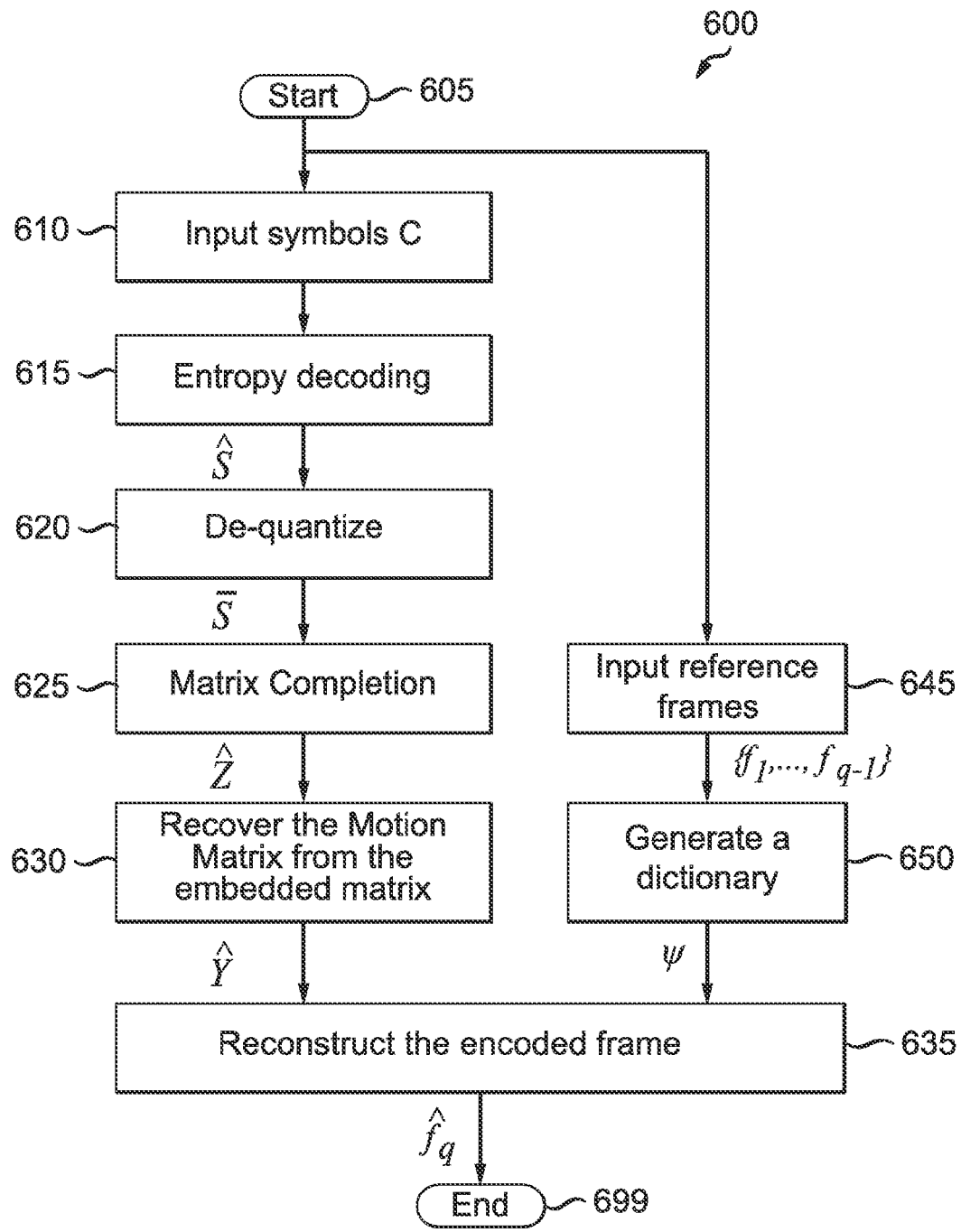
FIG. 6 is a flow diagram showing an exemplary method for decoding using a motion matrix based video coding scheme, in accordance with an embodiment of the present principles.

Turning to FIG. 6, an exemplary method for decoding using a motion matrix based video coding scheme is indicated generally by the reference numeral 600. The method 600 includes a start block 605 that passes control to a function block 610 and a function block 645. The function block 610 inputs encoded symbols C, and passes control to a function block 615. The function block 615 entropy decodes the received symbols C, and passes control to a function block 620. The function block 620 de-quantizes the decoded symbols C, and passes control to a function block 625. The function block 625 performs matrix completion, and passes control to a function block 630. The function block 630 recovers the motion matrix from the embedded matrix, and passes control to a function block 635. The function block 645 inputs reference frames $\{f_1, \ldots, f_{q-1}\}$, and passes control to a function block 650. The function block 650 generates a dictionary, and passes control to the function block 635. The function block 635 decodes the motion matrix to output $f_q$, and passes control to an end block 699.

The decoding method 600 has five major components:

1. Entropy decode the compressed symbols C to get $\hat{S}$, the quantized samples of the embedded matrix Z.

2. De-quantize the samples $\hat{S}$ to get $\bar{S}$, an approximate of the samples of the embedded matrix.

3. Having $\bar{S}$, an approximation of some entries of the embedded matrix Z, recover the discarded entries of the embedded compute Z by performing matrix completion. Note that this step is the inverse of the sampling (step 2) performed in the encoder. It is quite possible that discarded entries would not be recovered exactly due to the lossy step of the quantization. Thus, we denote the output of this stage by $\hat{Z}$.

4. Reconstruct $\hat{Y}$ (an approximation of) the motion matrix from $\hat{Z}$ (the embedded matrix recovered in the previous step). One might utilize the fact that the motion matrix has a sparse representation $\alpha$ with respect to the dictionary $\psi$ (i.e., $Vec(\hat{Y}) \Box Vec(Y) = \psi \alpha$) to form a (possibly under-determined) system of linear equations. More specifically, having $\hat{Z}$, we find $\hat{\alpha}$ the solution to the following:

$$Vec(\hat{Z}) \approx Vec(Z) = Vec(p_1 Y p_2) = (p_2^T \otimes p_1) Vec(Y) = (p_2^T \otimes p_1) \psi \alpha$$

This solution can be found by using a Compressed Sensing decoder (such as Basis Pursuit or Orthogonal Matching Pursuit). Consequently, (an approximation to) the motion matrix can be estimated by: $\hat{Y} = Vec^{-1}(\psi \hat{\alpha})$, where $Vec^{-1}(.)$ reshapes a vector back into the matrix form (see FIG. 4). It is important to note that the dictionary $\psi$ is not a function of the encoded frame and, hence, can be replicated in the decoder side without or with a very small overhead.

5. It is assumed that to reconstruct the encoded frame $f_2$, it is sufficient to have the motion matrix Y and the reference frames. Thus, we can utilize $\hat{Y} \approx Y$ the approximation of the original motion matrix (from the previous step) and the reference frames to reconstruct $\hat{f}_2$ (an approximation of the encoded frame $f_2$).

The Encoder

In this section, an example of an embodiment of a motion matrix is presented. Also, the required steps for encoding and decoding such a motion matrix are given with more details.

A Simple Motion Matrix

Suppose that we want to encode frame $f_2$ by utilizing a reference frame $f_1$. As stated before, the first stage of the proposed encoder is finding the motion matrix Y. A straightforward form of a motion matrix is a modified version of $f_2$ (i.e., the frame to be encoded) such that this modified version, denoted by $Y=\hat{f}_2$, has three key properties as follows:

(a) Y is of low-rank.
(b) Y has a sparse representation $\alpha$ with respect to an over-complete dictionary built from the reference frames and perhaps a number of other transforms such as DCT or Wavelet.
(c) Y is a good approximation of $f_2$ (the frame to be encoded); that is:

$$Y=\hat{f}_2 \approx f_2.$$

The first two properties are the requirements of the motion matrix and the third property states that there would be no need to infer the encoded frame from the motion matrix and the reference frames (step 5 of the decoder). In other words, the motion matrix itself is very close to the encoded frame and can be displayed directly.

Now, let us discuss the required steps to finding such a motion matrix with more details. The first step to find such a motion matrix is to generate the dictionary $\psi$ which the motion matrix $Y=\hat{f}_2$ would be sparse with respect to that. As stated before, this dictionary would only be a function of the reference frames (and not a function of the frame to be encoded). Hence, the dictionary can be exactly replicated in the decoder side. For instance, this dictionary might be formed by computing different movements (different shifts in different directions, rotations, zoom in, and so forth) or some predictions on the reference frames. To enhance this dictionary and also to guarantee that this dictionary can generate all possible images (i.e., this dictionary is full rank), some transforms (for example DCT, Wavelet, and so forth) can be added to the dictionary. Note that if designed properly, the high temporal correlation guarantees that the frame to be encoded has a sparse representation with respect to this dictionary.

After forming the target sparsifying dictionary $\psi$, it remains to find the motion matrix $Y=\hat{f}_2$. This motion matrix can be computed by the following method:

Inputs: The sparsifying dictionary $\psi$, reference frame $f_1$, the frame to be encoded $f_2$, target rank r and target sparsity k
Output: The motion matrix Y
Initialize $Y=f_2$
do {
  Find $\alpha$ the representation of Y with respect to $\psi$:
    $Vec(Y)=\psi\alpha$
  Let $\hat{\alpha}$ be the vector, computed by keeping only k largest entries of $\alpha$ and zero in the remaining indices.
  Update Y to $Vec(Y):=\psi\hat{\alpha}$
  Keep r largest Eigen-values of Y and set the remaining Eigen-values to zero
} Iterate until convergence or error is sufficiently small Essentially this method iterates between two constraints, namely (a) the output matrix Y has rank r and (b) the output matrix Y has a k-sparse representation with respect to the dictionary $\psi$. It is important to highlight a few notes as follows:

Tuning k and r controls the amount of compression. Specifically, as r and k increase, the quality of the motion matrix, which would be reconstructed in the decoder, would increase at the cost of achieving less compression and vice versa.

High spatial correlation allows reducing the rank of the frame to be encoded (r) significantly without introducing drastic drop in the quality of the motion matrix $Y=\hat{f}_2$.

High temporal correlation allows to approximate $f_2$, the frame to be encoded, with only a few (k) atoms in the dictionary $\psi$.

Matrix Embedding

Figure 7:
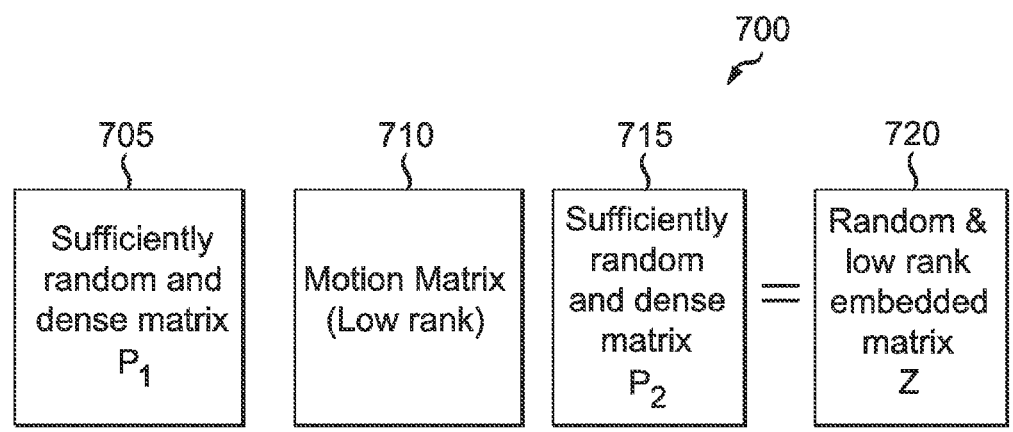
FIG. 7 is a diagram showing an exemplary method for embedding a motion matrix into a low-rank dense matrix Z, in accordance with an embodiment of the present principles.

Having the modified frame (or equivalently the motion matrix) $Y=\hat{f}_2$ and utilizing matrices $p_1$ and $p_2$, we embed $f_2$ into $Z=p_1\hat{f}_2p_2$. Here, the first matrix $p_1$ is a wide matrix, while the second matrix $p_2$ is a tall matrix. Furthermore, matrices $p_1$ and $p_2$ are chosen such that having the embedded matrix Z, $p_1$ and $p_2$, we are able to recover $Y=\hat{f}_2$. For instance, $p_1$ and $p_2$ might be random matrices, although such selection is not the optimal one. Turning to FIG. 7, an exemplary method for embedding a motion matrix into a low-rank dense matrix Z is indicated generally by the reference numeral 700. The method 700 involves a random and dense matrix $p_1$ 705, a motion matrix (low rank) 710, and a random and dense matrix $p_2$ 715, which are used to compress the low-rank motion matrix into another low-rank but more compact embedded matrix Z 720. The role of matrix embedding and also of matrices of $p_1$ and $p_2$ are discussed in more detail with respect to the decoder description. Note that matrix Z has a low rank (at most equal to the rank of the motion matrix). More importantly, matrix Z has fewer entries than the frame to be encoded $f_2$ or the modified/reconstructed version of the frame $f_2$, namely $Y=\hat{f}_2$.

Hence, this is the first level of compression in the proposed method. Clearly, there are some limitations on the compression level that can be achieved in this step. More specifically, the number of entries of matrix Z is a direct function of k and r in the previous step. Note that in the embodiments, different values of k and r can be used, or these values can be adaptive to the characteristics of frame $f_2$ or matrix Z.

Sampling

Figure 8:
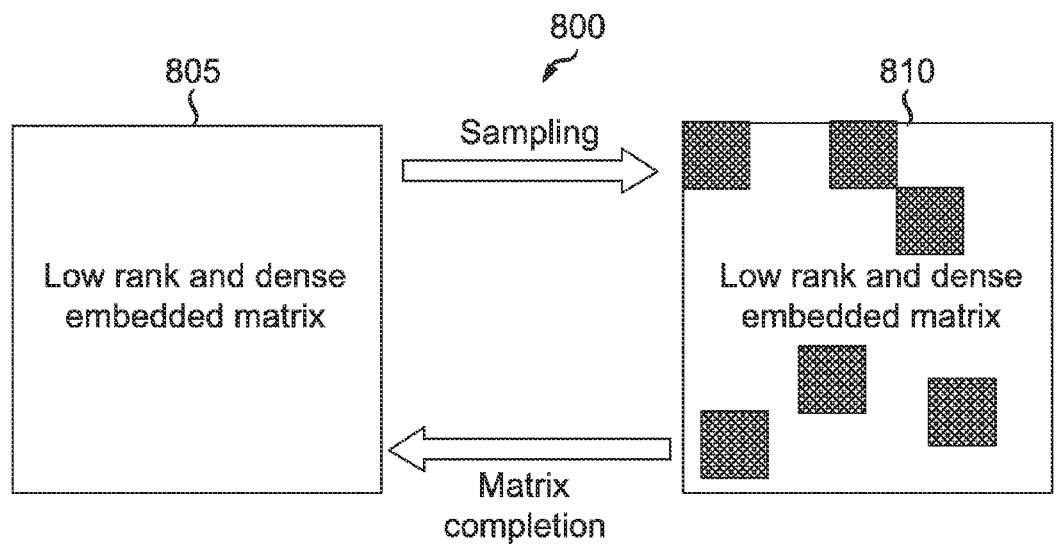
FIG. 8 is a diagram showing an exemplary method for sampling from the motion matrix and matrix completion, in accordance with an embodiment of the present principles.

Another level of compression is achieved by keeping only a relatively small random subset of entries (S) of the embedded matrix Z and discarding the rest of entries. Turning to FIG. 8, an exemplary method for sampling from the motion matrix and matrix completion is indicated generally by the reference numeral 800. The method 800 involves a low-rank and dense embedded matrix 805 and a low-rank and dense embedded matrix 810. If the decoder and the encoder use the same random seed and random number generator, only the entry values S are sent, and both the decoder and encoder will know the locations of these entries, which provides further compression (since the indices will not be sent).

Quantization and Entropy Coding

A random subset of entries of the embedded matrix Z from the previous stage (S) is quantized and passed through an entropy coder to get the final compressed symbols C.

The Decoder

Different components of the decoder are described and explained for the case of the primitive motion matrix introduced herein before.

De-quantization and Entropy Decoding

Similar to most traditional video encoding schemes, the first stage of the decoder decodes the compressed symbols C and de-quantizes the decoded symbols to get $\overline{S}$, an approximation of the random sub-set of entries of the embedded matrix Z.

Matrix Completion

Figure 9:
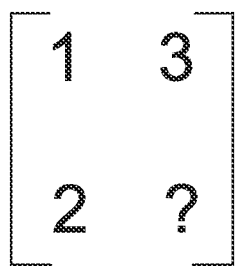
FIG. 9 is a diagram showing an example of low-rank matrix completion when corresponding Eigen-values are sufficiently random, in accordance with an embodiment of the present principles.
Figure 10:
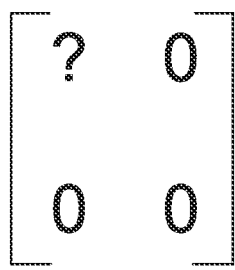
FIG. 10 is a diagram showing an example of a low-rank matrix that fails due to corresponding Eigen-values not being sufficiently random, in accordance with an embodiment of the present principles.

Recently a problem of great interest, namely "low-rank matrix completion", has been solved to some extent under some conditions. Broadly speaking, this problem addresses the following question: assume we have a low-rank matrix and are able to see only a subset of its entries, can we approximate the missing entries? Indeed, the answer to this question depends on the matrix. Turning to FIG. 9, an example of low-rank matrix completion when corresponding Eigen-vectors are sufficiently random is indicated generally by the reference numeral 900. Turning to FIG. 10, an example of a low-rank matrix that fails due to corresponding Eigen-vectors not being sufficiently random is indicated generally by the reference numeral 1000. Thus, for example, regarding example 900, if we are certain that the underlying matrix is low-rank, then the missing entry would be six, since the second column is three times the first column. On the other hand, regarding example 1000, the missing entry could be any number and might not be estimated. It has been shown that if some conditions are met, for instance the Eigen-vectors of a low-rank matrix are sufficiently random, then the low-rank matrix completion can be solved tractably and a number of algorithms such as Singular Value Thresholding (SVT), Fixed Point Continuation (FPC) and so forth have been proposed to solve this problem.

Now, the roles of the step of embedding and of the matrices of $p_1$ and $p_2$ should be clear. Specifically, these matrices guarantee that the Eigen-vectors of the embedded matrix Z are sufficiently random. Thus, many entries of such matrix can be discarded to achieve compression and meanwhile some matrix completion algorithms can recover those discarded entries. Exploiting the fact that the embedded matrix (Z) is of low-rank, the approximation of samples $\overline{S}$ are given to a matrix completion algorithm as input, to recover the missing entries of Z (see FIG. 8). Note that the recovered matrix $\tilde{Z}$ might not be equal to the embedded matrix (Z). This is due to the error propagation from the quantization step ($\overline{S} \neq S$). However, the estimation error $\|Z-\hat{Z}\|_F$ (where $\|.\|_F$ denotes the Frobenius matrix norm) would be proportional to the error introduced in the quantization step.

Solving an Under-Determined System of Linear Equations

Figure 11:
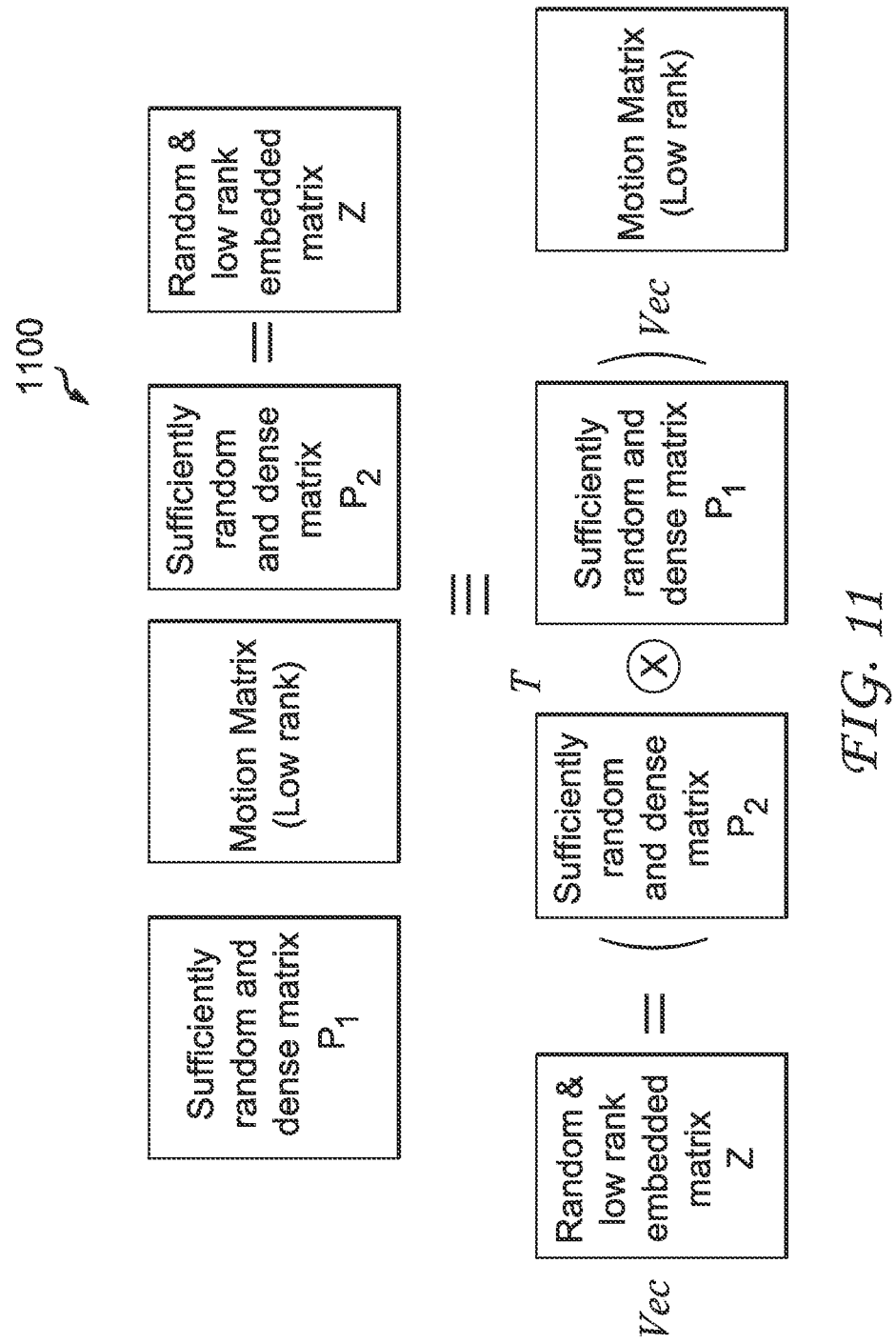
FIG. 11 is a diagram showing an example of an embedded matrix Z formed from compressive samples of a sparse representation of a modified frame $f_q'$, in accordance with an embodiment of the present principles.

Recall that the motion matrix $Y=\hat{f}_2$ or equivalently the modified version of the frame to be encoded, has (approximately) a sparse representation $\alpha$ with respect to the dictionary $\psi$ built over the reference frames, that is: Vec(Y)=$\psi\alpha$. Also note that the vectorized form of the embedded motion matrix $Z=p_1\hat{f}_2p_2$ can be re-expressed by:

$$Vec(Z)=Vec(p_1 Y p_2)=(p_2^T \otimes p_1)Vec(Y)=(p_2^T \otimes p_1)\psi\alpha \qquad (1)$$

where $\otimes$ is the Kronecker tensor product and Vec(.) represents the vectorized form of a matrix (see FIG. 11). Turning to FIG. 11, an example of an embedded matrix Z formed from compressive samples of a sparse representation of a modified frame $f_q'$ is indicated generally by the reference numeral 1100. Since the embedded matrix Z has a fewer number of entries compared to $Y=\hat{f}_2$, thus (1) is an underdetermined system of linear equations where the entries of embedded matrix Z are equations and entries of $\alpha$ are the unknowns. The recently developed theory of Compressed Sensing (CS) has shown that the solution to an underdetermined system of linear equations when the solution is sparse, can be computed tractably under certain conditions. Here, roles of the matrices $p_1$ and $p_2$ are to help to satisfy those conditions. Thus, having $\hat{Z}$ (an approximate of Z), the sparse vector $\alpha$ might be recovered by a generic CS decoder, for example, by using the algorithm of "Basis Pursuit". In other embodiments, other methods for recovering the sparse vector can be used, while maintaining the spirit of the present principles.

Consequently, the vectorized form of the motion matrix, can be recovered by the following:

$$Vec(Y)=\psi\alpha$$

Reshaping the vectorized form of the motion matrix, we obtain the motion matrix. However, in this example; we have assumed that the motion matrix is a good approximation of the encoded frame. Consequently, there is no need to infer the encoded frame from the motion matrix and the reference frames and we can display the derived motion matrix directly.

A description will now be given of some of the many attendant advantages/features of the present invention, some of which have been mentioned above. For example, one advantage/feature is an apparatus having a video encoder for encoding a picture in a video sequence using a motion matrix. The motion matrix has a rank below a given threshold and a sparse representation with respect to a dictionary. The dictionary includes a set of atoms and basis vectors for representing the picture and for permitting the picture to be derived at a corresponding decoder using only the set. The dictionary is formed from a set of reference pictures in the video sequence.

Another advantage/feature is the apparatus having the video encoder as described above, wherein the dictionary is formed from spatial and temporal correlations between the picture and the set of reference pictures.

Yet another advantage/feature is the apparatus having the video encoder as described above, wherein the video encoder includes an embedding device for embedding the motion matrix into an embedded matrix, a sampler for sampling the embedded matrix to provide a subset of samples from the embedded matrix, a quantizer for quantizing the subset of samples to provide a quantized subset of samples, and an entropy coder for entropy coding the quantized subset of samples into compressed symbols.

Still another advantage/feature is the apparatus having the video encoder wherein the video encoder includes an embedding device for embedding the motion matrix into an embedded matrix, a sampler for sampling the embedded matrix to provide a subset of samples from the embedded matrix, a quantizer for quantizing the subset of samples to provide a quantized subset of samples, and an entropy coder for entropy coding the quantized subset of samples into compressed symbols as described above, wherein the embedded matrix is determined using two matrices which are multiplied by the motion matrix, the two matrices being selected to provide a threshold amount of random Eigenvectors in the embedded matrix.

Moreover, another advantage/feature is the apparatus having the video encoder wherein the video encoder includes an embedding device for embedding the motion matrix into an embedded matrix, a sampler for sampling the embedded matrix to provide a subset of samples from the embedded matrix, a quantizer for quantizing the subset of samples to provide a quantized subset of samples, and an entropy coder for entropy coding the quantized subset of samples into compressed symbols as described above, wherein the subset of samples are randomly selected from the embedded matrix.

Further, another advantage/feature is the apparatus having the video encoder wherein the subset of samples are randomly selected from the embedded matrix as described above, wherein a same random seed and a same random number generator are used by the video encoder and a corresponding video decoder to ensure that the samples in the subset of samples from the embedded matrix have same respective locations at the video encoder and at the corresponding video decoder.

Also, another advantage/feature is the apparatus having the video encoder wherein the video encoder includes an embedding device for embedding the motion matrix into an embedded matrix, a sampler for sampling the embedded matrix to provide a subset of samples from the embedded matrix, a quantizer for quantizing the subset of samples to provide a quantized subset of samples, and an entropy coder for entropy coding the quantized subset of samples into compressed symbols as described above, wherein said sampler discards portions of the embedded matrix having different locations in the embedded matrix than the samples in the subset of samples.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding a picture in a video sequence using a motion matrix comprising data enabling a decoder to uniquely reconstruct the picture using said motion matrix and reference frames, wherein the motion matrix has a rank below a given value and a sparse representation with respect to a dictionary, said dictionary selected from among a plurality of dictionaries generated as a function of at least one reference frame and not of said picture being encoded, and said selection is based on achieving a target rank and target sparsity and said motion matrix is found by iteratively finding a representation of said picture in terms of said selected dictionary, keeping only said target sparsity number of largest entries of said representation, updating the motion matrix and keeping the largest target rank number of Eigenvalues of the motion matrix up to said target rank number until the representation converges to a particular level.

2. The apparatus of claim 1, wherein the dictionary is formed from spatial and temporal correlations between the picture and the set of reference pictures.

3. The apparatus of claim 1, wherein the video encoder comprises an embedding device for embedding the motion matrix into an embedded matrix, a sampler for sampling the embedded matrix to provide a subset of samples from the embedded matrix, a quantizer for quantizing the subset of samples to provide a quantized subset of samples, and an entropy coder for entropy coding the quantized subset of samples into compressed symbols.

4. The apparatus of claim 3, wherein the embedded matrix is determined using two matrices which are multiplied by the motion matrix, the two matrices being selected to provide a particular amount of random Eigen-vectors in the embedded matrix.

5. The apparatus of claim 3, wherein the subset of samples are randomly selected from the embedded matrix.

6. The apparatus of claim 5, wherein a same random seed and a same random number generator are used by the video encoder and a corresponding video decoder to ensure that the samples in the subset of samples from the embedded matrix have same respective locations at the video encoder and at the corresponding video decoder.

7. The apparatus of claim 3, wherein said sampler discards portions of the embedded matrix having different locations in the embedded matrix than the samples in the subset of samples.

8. In a video encoder, a method, comprising:
encoding a picture in a video sequence using a motion matrix, comprising data enabling a decoder to uniquely reconstruct the picture using said motion matrix and reference frames, wherein the motion matrix has a rank below a given value and a sparse representation with respect to a dictionary, said dictionary selected from among a plurality of dictionaries generated as a function of at least one reference frame and not of said picture being encoded, and said selection is based on achieving a target rank and target sparsity and said motion matrix is found by iteratively finding a representation of said picture in terms of said selected dictionary, keeping only said target sparsity number of largest entries of said representation, updating the motion matrix and keeping the largest target rank number of Eigenvalues of the motion matrix up to said target rank number until the representation converges to a particular level.

9. The method of claim 8, wherein the dictionary is formed from spatial and temporal correlations between the picture and the set of reference pictures.

10. The method of claim 8, wherein said encoding step comprises:
embedding the motion matrix into an embedded matrix;
sampling the embedded matrix to provide a subset of samples from the embedded matrix;
quantizing the subset of samples to provide a quantized subset of samples; and
entropy coding the quantized subset of samples into compressed symbols.

11. The method of claim 10, wherein the embedded matrix is determined using two matrices which are multiplied by the motion matrix, the two matrices being selected to provide a particular amount of random Eigen-vectors in the embedded matrix.

12. The method of claim 10, wherein the subset of samples are randomly selected from the embedded matrix.

13. The method of claim 12, wherein a same random seed and a same random number generator are used by the video encoder and a corresponding video decoder to ensure that the samples in the subset of samples from the embedded matrix have same respective locations at the video encoder and at the corresponding video decoder.

14. The method of claim 10, wherein said sampling step comprises discarding portions of the embedded matrix having different locations in the embedded matrix than the samples in the subset of samples.

15. An apparatus, comprising:
a video decoder for decoding a picture in a video sequence using an approximation of a motion matrix, comprising data enabling a decoder to uniquely reconstruct the picture using said motion matrix and reference frames wherein the approximation of the motion matrix has a rank below a given value and a sparse representation with respect to a dictionary, said dictionary selected from among a plurality of dictionaries generated as a function of at least one reference frame and not of said picture being encoded, and said selection is based on achieving a target rank and target sparsity and said motion matrix is found by iteratively finding a representation of said picture in terms of said selected dictionary, keeping only said target sparsity number of largest entries of said representation, updating the motion matrix and keeping the largest target rank number of Eigenvalues of the motion matrix up to said target rank number until the representation converges to a particular level.

16. The apparatus of claim 15, wherein the dictionary is formed from spatial and temporal correlations between the picture and the set of reference pictures.

17. The apparatus of claim 15, wherein the video decoder comprises an entropy decoder for entropy decoding compressed symbols to provide a quantized subset of samples from an embedded matrix, a de-quantizer for de-quantizing the quantized subset of samples to provide an approximation of a subset of samples from a recovered version of the embedded matrix, a matrix completion device for determining missing portions of the recovered version of the embedded matrix to provide a completed recovered version of the embedded matrix, and a reconstruction device for reconstructing the approximation of the motion matrix from the completed recovered version of the embedded matrix.

18. The apparatus of claim 17, wherein the missing portions of the recovered version of the embedded matrix correspond to previously discarded portions of the embedded matrix having different locations in the embedded matrix than the samples in the subset of samples.

19. The apparatus of claim 17, wherein the approximation of the motion matrix is determined using the embedded matrix and two matrices which are multiplied by the embedded matrix matrix.

20. The apparatus of claim 17, wherein a same random seed and a same random number generator are used by the video decoder and a corresponding video encoder to ensure that the samples in the subset of samples from the embedded matrix have same respective locations at the video decoder and at the corresponding video encoder.

21. The apparatus of claim 15, wherein a sparse representation of the motion matrix is determined with respect to the recovered version of the embedded matrix, and a vectorized form of the picture is determined responsive to the sparse representation and the dictionary, and wherein the vectorized form is reshaped to obtain a reconstructed version of the picture.

22. In a video decoder, a method, comprising:
decoding a picture in a video sequence using an approximation of a motion matrix, comprising data enabling a decoder to uniquely reconstruct the picture using said motion matrix and reference frames wherein the approximation of the motion matrix has a rank below a given value and a sparse representation with respect to a dictionary, said dictionary selected from among a plurality of dictionaries generated as a function of at least one reference frame and not of said picture being encoded, and said selection is based on achieving a target rank and target sparsity and said motion matrix is found by iteratively finding a representation of said picture in terms of said selected dictionary, keeping only said target sparsity number of largest entries of said representation, updating the motion matrix and keeping the largest target rank number of Eigenvalues of the motion matrix up to said target rank number until the representation converges to a particular level.

23. The method of claim 22, wherein the dictionary is formed from spatial and temporal correlations between the picture and the set of reference pictures.

24. The method of claim 22, wherein the method further comprises:
entropy decoding compressed symbols to provide a quantized subset of samples from an embedded matrix;
de-quantizing the quantized subset of samples to provide an approximation of a subset of samples from a recovered version of the embedded matrix;
determining missing portions of the recovered version of the embedded matrix to provide a completed recovered version of the embedded matrix; and
reconstructing the approximation of the motion matrix from the completed recovered version of the embedded matrix.

25. The method of claim 24, wherein the missing portions of the recovered version of the embedded matrix correspond to previously discarded portions of the embedded matrix having different locations in the embedded matrix than the samples in the subset of samples.

26. The method of claim 24, wherein the approximation of the motion matrix is determined using the embedded matrix and two matrices which are multiplied by the embedded matrix.

27. The method of claim 24, wherein a same random seed and a same random number generator are used by the video decoder and a corresponding video encoder to ensure that the samples in the subset of samples from the embedded matrix have same respective locations at the video decoder and at the corresponding video encoder.

28. The method of claim 22, wherein a sparse representation of the motion matrix is determined with respect to the recovered version of the embedded matrix, and a vectorized form of the picture is determined responsive to the sparse representation and the dictionary, and wherein the vectorized form is reshaped to obtain a reconstructed version of the picture.

29. A non-tangible computer readable program storage unit having video signal data encoded thereupon, comprising:
a picture in a video sequence encoded using a motion matrix comprising data enabling a decoder to uniquely reconstruct the picture using said motion matrix and reference frames, wherein the motion matrix has a rank below a given value and a sparse representation with respect to a dictionary, said dictionary selected from among a plurality of dictionaries generated as a function of at least one reference frame and not of said picture being encoded, and said selection is based on achieving a target rank and target sparsity and said motion matrix is found by iteratively finding a representation of said picture in terms of said selected dictionary, keeping only said target sparsity number of largest entries of said representation, updating the motion matrix and keeping the largest target rank number of Eigenvalues of the motion matrix up to said target rank number until the representation converges to a particular level.

30. An apparatus, comprising:
a video encoder for encoding a picture in a video sequence using a motion matrix, wherein said motion matrix comprising data enabling a decoder to uniquely reconstruct the picture using said motion matrix and reference frames,
wherein the motion matrix has a given rank, and a vector formed by stacking the columns of the motion matrix consists of a product of a dictionary and a sparse vector wherein the dictionary comprising a set of atoms and basis vectors for representing the picture and for permitting the picture to be derived at a corresponding decoder using only the set,
the dictionary formed from a set of reference pictures in the video sequence to minimize the number of non-zero residue values, and wherein
said motion matrix is found by
a first step for finding a first vector, wherein a product of the dictionary and the first vector represent a vector formed by stacking the columns of a first matrix of which initial values are the picture;
a second step for creating a second vector keeping only a given number of largest entries of the first vector and zero in the remaining entries;
a third step for creating a second matrix, wherein a vector formed by stacking the columns of the first matrix is a product of the dictionary and the second vector;
a fourth step for creating a third matrix keeping only a given number of largest Eigen-values of the second matrix as the given rank and zero in the remaining Eigen-values; and
a fifth step for substituting the third matrix for the first matrix to iterate the first to fourth steps until differences of respective Eigen-values between the first matrix and the third matrix are smaller than a given value, and considering the first matrix to be the motion matrix and the first vector to be the sparse vector when the differences of respective Eigen-values are smaller than the given value.

31. In a video encoder, a method, comprising:
encoding a picture in a video sequence using a motion matrix, wherein said motion matrix comprising data enabling a decoder to uniquely reconstruct the picture using said motion matrix and reference frames,
wherein the motion matrix has a given rank, and a vector formed by stacking the columns of the motion matrix consists of a product of a dictionary and a sparse vector wherein the dictionary comprising a set of atoms and basis vectors for representing the picture and for permitting the picture to be derived at a corresponding decoder using only the set,
the dictionary formed from a set of reference pictures in the video sequence to minimize the number of non-zero residue values, and
wherein said motion matrix is found by
a first step for finding a first vector, wherein a product of the dictionary and the first vector represent a vector formed by stacking the columns of a first matrix of which initial values are the picture;
a second step for creating a second vector keeping only a given number of largest entries of the first vector and zero in the remaining entries;
a third step for creating a second matrix, wherein a vector formed by stacking the columns of the first matrix is a product of the dictionary and the second vector;
a fourth step for creating a third matrix keeping only a given number of largest Eigen-values of the second matrix as the given rank and zero in the remaining Eigen-values; and
a fifth step for substituting the third matrix for the first matrix to iterate the first to fourth steps until differences of respective Eigen-values between the first matrix and the third matrix are smaller than a given value, and considering the first matrix to be the motion matrix and the first vector to be the sparse vector when the differences of respective Eigen-values are smaller than the given value.

32. An apparatus, comprising:
a video decoder for decoding a picture in a video sequence using an approximation of a motion matrix, comprising data enabling said video decoder to uniquely reconstruct the picture using said motion matrix and reference frames
wherein the approximation of the motion matrix has a given rank, and a vector formed by stacking the columns of the motion matrix consists of a product of a dictionary and a sparse vector, wherein, the dictionary comprising a set of atoms and basis vectors for representing the picture and for permitting the picture to be derived at the video decoder using only the set,
the dictionary formed from a set of reference pictures in the video sequence to minimize the number of non-zero residue values, and
wherein said motion matrix is found by
a first step for finding a first vector, wherein a product of the dictionary and the first vector represent a vector formed by stacking the columns of a first matrix of which initial values are the picture;
a second step for creating a second vector keeping only a given number of largest entries of the first vector and zero in the remaining entries;
a third step for creating a second matrix, wherein a vector formed by stacking the columns of the first matrix is a product of the dictionary and the second vector;

a fourth step for creating a third matrix keeping only a given number of largest Eigen-values of the second matrix as the given rank and zero in the remaining Eigen-values; and a fifth step for substituting the third matrix for the first matrix to iterate the first to fourth steps until differences of respective Eigen-values between the first matrix and the third matrix are smaller than a given value, and considering the first matrix to be the motion matrix and the first vector to be the sparse vector when the differences of respective Eigen-values are smaller than the given value.

33. In a video decoder, a method, comprising:

decoding a picture in a video sequence using an approximation of a motion matrix, comprising data enabling said video decoder to uniquely reconstruct the picture using said motion matrix and reference frames wherein the approximation of the motion matrix has a given rank, and a vector formed by stacking the columns of the motion matrix consists of a product of a dictionary and a sparse vector, wherein, the dictionary comprising a set of atoms and basis vectors for representing the picture and for permitting the picture to be derived at the video decoder using only the set, the dictionary formed from a set of reference pictures in the video sequence to minimize the number of non-zero residue values, and wherein said motion matrix is found by a first step for finding a first vector, wherein a product of the dictionary and the first vector represent a vector formed by stacking the columns of a first matrix of which initial values are the picture;

a second step for creating a second vector keeping only a given number of largest entries of the first vector and zero in the remaining entries;

a third step for creating a second matrix, wherein a vector formed by stacking the columns of the first matrix is a product of the dictionary and the second vector;

a fourth step for creating a third matrix keeping only a given number of largest Eigen-values of the second matrix as the given rank and zero in the remaining Eigen-values; and a fifth step for substituting the third matrix for the first matrix to iterate the first to fourth steps until differences of respective Eigen-values between the first matrix and the third matrix are smaller than a given value, and considering the first matrix to be the motion matrix and the first vector to be the sparse vector when the differences of respective Eigen-values are smaller than the given value.

* * * * *